United States Patent
Yunoki

(10) Patent No.: US 6,723,171 B2
(45) Date of Patent: Apr. 20, 2004

(54) PROCESS FOR EXTRACTING SOLID MATERIAL FROM SHELL-AND-TUBE REACTOR

(75) Inventor: Hiromi Yunoki, Himeji (JP)

(73) Assignee: Nippon Shokubai Co., Ltd., Osaka (JP)

(*) Notice: Subject to any disclaimer, the term of this patent is extended or adjusted under 35 U.S.C. 154(b) by 109 days.

(21) Appl. No.: 10/041,512

(22) Filed: Jan. 7, 2002

(65) Prior Publication Data

US 2002/0139396 A1 Oct. 3, 2002

(30) Foreign Application Priority Data

Jan. 25, 2001 (JP) .......................... 2001-017065

(51) Int. Cl.[7] .............. B08B 9/00; B08B 9/04; B08B 9/027
(52) U.S. Cl. ............ 134/8; 134/10; 134/22.11; 134/22.12; 134/22.18; 134/24; 134/37
(58) Field of Search .................. 134/8, 10, 22.11, 134/22.12, 22.18, 24, 37

(56) References Cited

U.S. PATENT DOCUMENTS

| | | |
|---|---|---|
| 4,031,031 A | 6/1977 | Yamaguchi et al. |
| 4,342,699 A | 8/1982 | Palmer et al. |
| 5,048,601 A | 9/1991 | Yamaguchi et al. |
| 5,206,431 A | 4/1993 | Hashiba et al. |
| 5,228,484 A | 7/1993 | Johnson |
| 6,069,217 A | 5/2000 | Nae et al. |
| 6,153,767 A | 11/2000 | Sagane et al. |

FOREIGN PATENT DOCUMENTS

| | | |
|---|---|---|
| GB | 2 001 257 A | 1/1979 |
| JP | 50-140369 | 11/1975 |
| JP | 54-21966 | 2/1979 |
| JP | 56-108525 A | 8/1981 |
| JP | 59-39342 A | 3/1984 |
| JP | 59-73038 A | 4/1984 |
| JP | 59-82943 A | 5/1984 |
| JP | 61-35842 A | 2/1986 |
| JP | 62-121644 A | 6/1987 |
| JP | 3-57906 B2 | 9/1991 |
| JP | 4-210937 A | 8/1992 |
| JP | 5-125010 A | 5/1993 |
| JP | 7-73674 B2 | 8/1995 |
| JP | 9-141083 A | 6/1997 |
| JP | 9-323950 A | 12/1997 |
| JP | 11-130722 A | 5/1999 |
| JP | 2000-1484 A | 1/2000 |

*Primary Examiner*—Zeinab El-Arini
(74) *Attorney, Agent, or Firm*—Haugen Law Firm PLLP

(57) ABSTRACT

The present invention provides: a process which involves safely and sanitarily extracting a solid material from a shell-and-tube reactor with good efficiency. The process comprises the step of extracting a solid material 90 that is packed in a reaction tube 20 of a shell-and-tube reactor 10, with the process further comprising: the step (a) of inserting an aspirating tube 30 from an end of the reaction tube 30 wherein the aspirating tube 30 is connected to an exhaust gas aspirator 70; and the step (b) of extracting the solid material 90 from the reaction tube 20 by aspirating the solid material 90 in the reaction tube 20 from a tip of the aspirating tube 30 together with a stream of air.

4 Claims, 6 Drawing Sheets

PROCESS FOR EXTRACTING SOLID MATERIAL FROM SHELL-AND-TUBE REACTOR

BACKGROUND OF THE INVENTION

A. Technical Field

The present invention relates to a process for extracting a solid material packed in each reaction tube of a shell-and-tube reactor, for example, a packed material such as a catalyst used for a catalytic reaction of hydrocarbons.

B. Background Art

In the fields of petrochemical industry, many catalytic reactions, such as an oxidation reaction, an ammoxidation reaction, a decomposition reaction, a reduction reaction, and a reforming reaction of hydrocarbons, are carried out with a shell-and-tube reactor. The reactor used for these reactions is packed with a catalyst or inert filler suitable for each catalytic reaction.

The following techniques are concretely known.

JP-A-1484/2000 describes a production process for pyromellitic anhydride, which comprises the steps of: packing two or more catalysts including different components and vanadium as an essential component in a reaction tube; and carrying out a catalytic gas-phase oxidation of 1,2,4,5-tetraalkylbenzene.

JP-A-323950/1997 describes a production process for methacrolein, which comprises the steps of: packing a reaction tube with a catalyst including molybdenum, bismuth, and iron as essential components of which activities are controlled by changing a mixing ratio of an inert raschig ring; and carrying out a catalytic gas-phase oxidation of at least one kind selected from isobutylene and/or t-butyl alcohol.

JP-B-57906/1991 describes a production process for maleic anhydride, which comprises the steps of: packing a reaction tube with a catalyst including phosphorus and vanadium as essential components of which activities are controlled by changing a mixing ratio of an inert alumina pellet; and carrying out a catalytic gas-phase oxidation of n-butane.

JP-A-130722/1999 describes a production process for acrylic acid, which comprises the steps of: arranging a packed inert substance layer between a proceeding packed catalyst layer and a latter packed catalyst layer wherein the proceeding packed catalyst layer includes molybdenum, bismuth, and iron as essential components, and the latter packed catalyst layer includes molybdenum and vanadium as essential components; and carrying out a two-step catalytic gas-phase oxidation of propylene with one shell-and-tube heat-exchanging reactor.

When the catalyst as used for these catalytic reactions is used for a definite period, its activity or mechanical strength is generally lowered by such as poisoning, caulking or sintering. Therefore, the catalyst is extracted from the reactor and exchanged to a new catalyst each time.

When the catalyst is exchanged, the following method is employed as a method for extracting a solid material such as these catalysts in the reactor: a method that involves entering a worker in a reactor, and dropping a solid material in a reaction tube while the worker spears up with such as a metal thin stick from a lower opening portion of the reaction tube.

In addition, U.S. Pat. No. 5,228,484 describes a technique that involves: inserting a nozzle into a reaction tube from its upper end; blowing high-pressure air from a tip of the nozzle; unfastening or fluidizing the catalyst as packed in the reaction tube by the high-pressure air; raising and sending the catalyst into a filling room arranged at the upper end of the reaction tube by the high-pressure air; and exhausting the catalyst by vacuum-exhausting the filling room.

In the conventional method for extracting the solid material by using the spearing stick, whenever being speared by the stick, the solid materials such as the catalyst or these cracked materials in the reaction tube are dropped, and the solid materials as dropped are scattered on a floor and cause plenty of powdery dust. Therefore, the working environment is extremely poor foil the worker.

In addition, these materials as dropped and the powdery dust are often poisonous substances for human body. Therefore, the worker as employed in the extracting work requires putting on protectors, such as a dust-inhibiting wear, a goggle, a dust-inhibiting mask, and gloves.

Furthermore, the catalyst as used for these catalytic reactions may often include noble metals in high concentration. Therefore, the waste catalyst as extracted may be treated to recover metals. However, in case of a reactor of which reaction tube is packed with two or more kinds of catalysts and an inert substance as described in JP-A-130722/1999, the conventional extracting method results in mixing these catalysts and inert substance as dropped from the reaction tube and taking plenty of labor for classifying and recovering the catalysts.

In an industrial operation, a shell-and-tube reactor ordinary has hundreds to tens of thousands of reaction tubes. Therefore, when these solid materials such as catalysts in the reactor are extracted by the conventional method, not only a worker employed in the extracting work greatly feels bodily and mental pain but also the environment is badly influenced.

In addition, in the method that involves using the high-pressure air, the filling room is arranged at the upper end of the reaction tube. Therefore, the problem of causing the powdery dust is reduced. However, the method requires having air-tightness between the filling room and the upper end of the reaction tube, wherein the catalyst enters the filling room together with the high-pressure air. The high-pressure air nozzle as sent into the reaction tube penetrates and passes through the filling room. Therefore, there are also problems of air-tightness at this penetrated portion. As these airtight structures are complicated, the apparatus becomes a large-scale one, such that an apparatus having a mechanism of both supplying the high-pressure air and vacuum-exhausting is necessary, and the workability is not very good.

SUMMARY OF THE INVENTION

A. Objects of the Invention

Accordingly, an object of the present invention is to provide a process, which solves the problems of the prior arts, and involves safely and sanitarily extracting a solid material from a shell-and-tube reactor with good efficiency.

B. Disclosure of the Invention

The present invention is a process for extracting a solid material from a shell-and-tube reactor, which comprises the step of extracting the solid material that is packed in a reaction tube of the shell-and-tube reactor, with the process further comprising: the step (a) of inserting an aspirating tube from an end of the reaction tube wherein the aspirating tube is connected to an exhaust gas aspirator; and the step (b) of extracting the solid material from the reaction tube by aspirating the solid material in the reaction tube from a tip of the aspirating tube together with a stream of air.

EXPLANATION OF THE SYMBOLS

Figure 1:
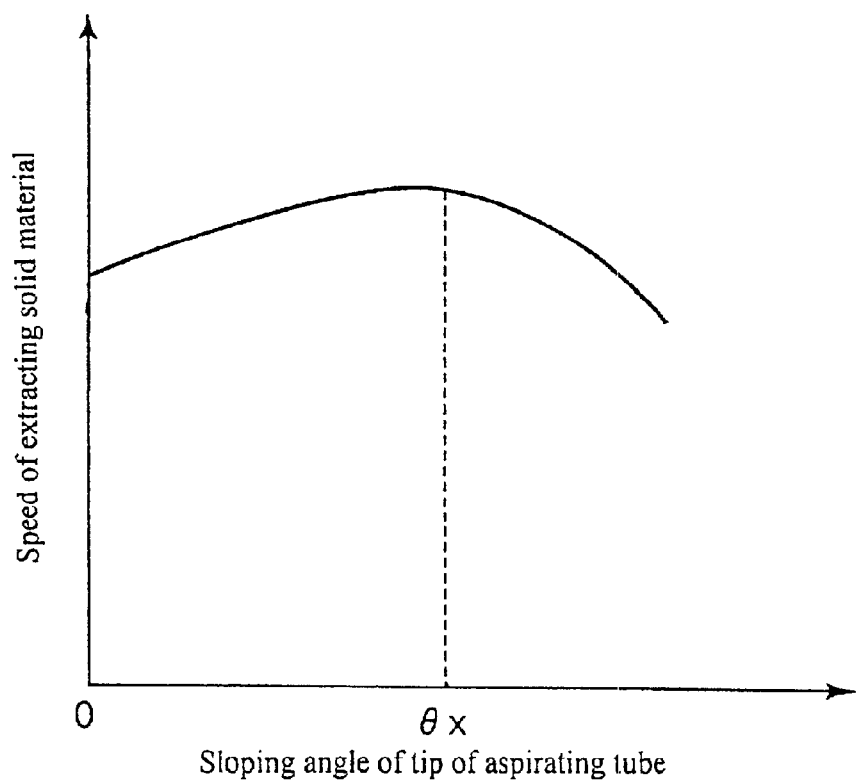
FIG. 1 is a graph showing the relationship between the sloping angle of a tip of an aspirating tube and the speed of extracting a solid material.

| | |
|---|---|
| 1 | Reactor |
| 12, 14 | In/outlets |
| 20 | Reaction tube |
| 30 | Aspirating tube |
| 32 | Piping |
| 34 | Hollow portion |
| 36 | Projection |
| 40 | Solid-material-trapping apparatus |
| 70 | Exhaust gas pump |
| 90 | Solid material |

DETAILED DESCRIPTION OF THE INVENTION

Shell-and-tube Reactor

A shell-and-tube reactor as used in techniques for production or treatment of ordinary chemical products is used. For example, the techniques as disclosed in the following are applicable: JP-A-21966/1979, JP-A-108525/1981, JP-A-39342/1984, JP-A-82943/1984, JP-A-121644/1987, JP-A-125010/1993, and JP-B-73674/1995.

The reaction tube as arranged in the longitudinal direction is generally used. However, the reaction tube as arranged in the lateral direction or as diagonally arranged as disclosed in JP-A-141083/1997 may be used.

The kind of the material of the reaction tube is not especially limited, and the kind of the material as used for an ordinary catalytic reaction, such as stainless steel and carbon steel, can be employed. The inner diameter (D) of the reaction tube is in the range of 10 to 60 mm, favorably 15 to 50 mm, more favorably 20 to 40 mm.

The reaction tube is generally linear all over the entirety of its length, but a curved tube or a tube of which inner diameter is varied in the axial direction can also be used.

Reaction

If the reaction is carried out with a shell-and-tube reactor by packing the reaction tube with a solid material such as a catalyst, the reactor is applicable to ordinary catalytic reactions and other chemical reactions.

The shell-and-tube reactor is applicable to the reactions as disclosed in JP-A-1484/2000, JP-A-323950/1997, JP-B-57906/1991, and JP-A-130722/1999.

As to a reaction fluid, a reaction fluid having mode used for an ordinary shell-and-tube reactor (for example, gas, solution, and emulsion) can be used.

Solid Material

The solid material in the reaction tube is not especially limited if it is a solid material as used in various reactions with the shell-and-tube reactor and an adherent material as formed in a reaction tube when the various reactions are carried out. Examples thereof include various catalytic reaction catalysts, and adherent substances such as inert substances and carbonized materials.

The catalyst for the catalytic reaction is a catalyst as generally used for such as an oxidation reaction, an ammoxidation reaction, an decomposition reaction, a reduction reaction, and a reforming reaction of hydrocarbons. However, the catalyst is not limited thereto.

The inert substance can be used as: a supporter for supporting a catalyst; a preheating or cooling material for a reaction fluid; and a catalyst-diluting material to control catalyst activity when a catalyst is packed in a shell-and-tube reactor. It generally means an inert substance for the various catalytic reactions (a raw material and an aimed product). Examples thereof include: various ceramics, such as alumina, silica, silica-alumina, silicon carbide, silicon nitride, and steatite; and various fillers made of metals, such as carbon steel and stainless steel.

Examples of the catalyst, the inert substance, and the adherent substance to the inner surface of the reaction tube include accumulated materials, such scattered or sublimed materials derived from: impurities slightly included in the reaction fluid; products obtained by the catalytic reaction (carbonized materials); and catalyst components.

The catalyst or inert substance is ordinary used in a particulate lump form. The particulate form is not especially limited, and the form may be a spherical shape, a columnar shape, a ring shape, or an unfixed shape.

As to a particle diameter of the solid material as extracted, for example, when the solid material has a spherical or columnar shapes its diameter is regarded as a particle diameter. When it has a ring shape, its outer diameter is regarded as a particle diameter. The ratio (S/D) of the particle diameter (S) of the solid material and the inner diameter (D) of the reaction tube is not larger than 0.5, favorably not larger than 0.45, more favorably not larger than 0.40. However, even though a solid material has the above ratio of larger than 0.5, but when the solid material can be cracked to the ratio of not larger than 0.5 by a tip of an aspirating tube, this limitation is not applied.

Aspirating Tube

An aspirating tube of which cross sectional shape is circular is ordinary used because a worker as employed in the extracting work can easily grip it and the workability is good. However, an oval or a polygon may also be employed as the cross sectional shape. The shape may fitly be selected according to the cross sectional shape of the reaction tube.

The aspirating tube has high rigidity and may be difficult to deform, or it has flexibility and can be bent. However, the aspirating tube favorably has shape-maintenance such that it does not collapse under a reduced pressure at the exhaust-aspiration.

As to the kind of the material of the aspirating tube, an aspirating tube made of polyethylene has good workability and can easily be used because of properly bending.

However, an aspirating tube, which is made of: resins, such as polypropylene, teflon, and polyvinyl chloride; and metals, such as stainless steel and carbon steel, can be used. These two or more material layers may be accumulated or tied together, and the resultant tube can be used.

Of the aspirating tube, the kind of the material or shaped structure of the portion to be inserted into the reaction tube of the reactor can be different from that of the portion to be extended outside of the reaction tube. Furthermore, of the portion to be inserted into the reaction tube, the kind of the material or shaped structure of the tip portion can be different from that of the rear portion.

The thickness (T) of the tube wall of the aspirating tube is different according to its kind of the material or required capacity, but T is ordinary not thicker than 5 mm, favorably in the range of 1 to 3 mm, more favorably 1 to 2 mm.

Exhaust Gas Aspirator

The exhaust gas aspirator is connected to the aspirating tube in order to aspirate the solid material from the tip of its opening together with a stream of air.

The structure or specifications of the exhaust gas aspirator as used is similar to that of an aspirator as conventionally used. The exhaust gas aspirator comprises an exhaust gas pump that is driven by a power source, such as a motor and an engine. The structure or mechanism of the exhaust gas pump can be employed similar to that of an exhaust gas pump as conventionally used.

The aspirating tube is connected to an air-aspiration inlet of the exhaust gas aspirator. The aspirating tube may directly be connected to the exhaust gas aspirator, or the space existing between the aspirating tube and the exhaust gas aspirator can be connected with a piping.

A trap can be settled between the aspirating tube and the exhaust gas pump in order that only the solid material can be collected by separating the stream of the air and the solid material. The separating method of the stream of the air and the solid material as extracted is not especially limited. A gravity-type, centrifugation-type, or inertia-type sieve that is generally used for classifying a solid material, or a filter having a suitable mesh opening size can be used.

In addition, in order to prevent particulate powders from contaminating the exhaust gas pump wherein the powders cannot be collected by the trap, a trapping apparatus (for example, a bug filter having a suitable mesh opening size and a cyclone) is favorably settled between the trap and the exhaust gas pump.

As to the ability of the exhaust gas aspirator, namely, the air-aspiration amount, an apparatus having suitable ability may be used by synthetically judging the size and specific gravity of the solid material to be extracted, the extent of the adhesion of the solid material (for example, a catalyst) to a receptacle, the endured pressure of the aspirating tube (if the inside of the aspirating tube is under reduced pressure, the tube is not crushed.), the resistance of the piping, and the speed of extracting the solid material (the necessary time for extracting the solid material per one reaction tube).

A cooler or a silencer is settled at the exhaust gas aspirator, and then the bad influence upon the environment can be reduced.

Extraction of Solid Material

In case of the shell-and-tube reactor of which reaction tube is arranged in the longitudinal direction, the position where the aspirating tube is inserted is from either an upper-end opening portion or a lower-end opening portion. A method having good workability may be employed in consideration of such as the structure of the reactor. In general, the insertion as carried out from the upper-end opening portion of the reaction tube has better workability such that the working posture is comfortable.

The stream of the air is caused by inserting the tip of the aspirating tube from any of opening portions and by aspirating the air in the reaction tube from the tip of the aspirating tube. When the tip of the reaction tube is allowed to come near the solid material of the reaction tube, the solid material is carried into the reaction tube by the stream of the air at the tip portion of the reaction tube and extracted from the reaction tube. The air outside of the reaction tube is passed through the space between the inner wall of the reaction tube and the outer wall of the aspirating tube, and then supplied to the tip portion of the reaction tube in order. The solid material in the reaction tube can be extracted in turn by gradually inserting the tip of the aspirating tube toward the inside of the reaction tube together with aspirating the solid material.

Then, in the case where the interval between the tip of the aspirating tube and the solid material is too larger, the speed of extracting the solid material is lowered and the solid material cannot be extracted depending on circumstances. In addition, in the case where the interval between the solid material and the tip of the aspirating tube is extremely small or the space between the inner wall of the reaction tube and the outer wall of the aspirating tube is small, the speed of extracting the solid material is also lowered.

That is to say, the speed of extracting the solid material is increased by effectively carrying out the supply of the air to the aspirating tube and by operating the position of the tip portion of the aspirating tube so that the solid material will be positioned in or in the neighborhood of the stream of the air at the tip of the aspirating tube. For example, such an effect can be obtained by devising the outer diameter of the aspirating tube to make a suitable space between the inner wall of the reaction tube and the aspirating tube, and further by cutting the tip of the aspirating tube to have a suitable shape.

Tip of Aspirating Tube

The space between the inner wall of the reaction tube and the tip of the aspirating tube inserted into the inside of the reaction tube, namely, the ratio of the inner diameter (D) of the reaction tube and the outer diameter (d1) of the tip of the aspirating tube has a great influence upon the speed of extracting the solid material. The extracting work can efficiently be carried out if the ratio (d1/D) is concretely in the range of 0.7 to 0.95, favorably 0.72 to 0.9, more favorably 0.75 to 0.85. The smaller the d1/D is, the larger the space is between the inner wall of the reaction tube and the aspirating tube, and the air outside of the reaction tube is efficiently supplied to the tip the aspirating tube. However, the opening area of the inside of the aspirating tube becomes smaller. In the case where the d1/D is too small, not only the amount of the solid material as extracted is decreased but also the aspirating tube is easily clogged with the solid material. In the case where the d1/D is too large, the space between the inner wall of the reaction tube and the aspirating tube becomes smaller. Therefore, the air as breathed outside of the reaction tube is decreased, and it is difficult to insert the aspirating tube into the reaction tube together with difficultly extracting the solid material, and it is difficult to insert the aspirating tube into the inside of the reaction tube because the frictional resistance between the inner wall of the reaction tube and the aspirating tube is increased.

In addition, the ratio (d2/S) of the particle diameter (S) of the solid material and the inner diameter (d2) of the aspirating tube has a great influence upon the speed of extracting the solid material. The ratio (d2/S) is concretely not smaller than 2.5, favorably not smaller than 2.7, more favorably not smaller than 3 wherein the d2 should be satisfied with the following equation: d1−d2×2<0. In the case where the d2/S is too small, it is difficult to aspirate the solid material into the inside of the aspirating tube, and the aspirating tube is easily clogged with the solid material. Therefore, the working efficiency is extremely decreased.

The tip shape of the aspirating tube that is inserted into the reaction tube may fitly be selected in consideration of the shape or size of the solid material, the adhering state to the reaction tube, and the speed of extracting the solid material. If the shape as efficiently utilized for the stream of the air at the tip portion of the aspirating tube to extract the solid material is selected, it is favorable that the solid material is easily extracted together with the stream of the air and the speed of the extracting the solid material is increased.

For example, when a cylindrical aspirating tube is used, the aspirating tube may have a circular end surface which is obtained by horizontally cutting with a surface perpendicular to the tube axis direction of the aspirating tube, or may have an elliptic end surface sloping at a constant angle θ toward a surface perpendicular to the tube axis direction of the aspirating tube.

It is necessary to consider the relationship between the sloping angel θ and the speed of extracting the solid material so that the solid material in the reaction tube can efficiently be extracted.

Accordingly, the present inventor examined the relationship between the sloping angel θ of the tip of the aspirating tube and the speed of extracting the solid material. As a result, as is shown in FIG. 1, he found that: the speed of extracting the solid material is increased in proportion to the sloping angel as enlarged from θ=0; but the speed of extracting the solid material tends to decrease when the sloping angel is not smaller than a certain sloping angel θx.

Needless to say, the sloping angel θx when the speed of extracting the solid material is a maximum is varied according to the air-aspiration amount of the exhaust gas aspirator, the size of the solid material in the reaction tube, or the d1/D. However, when the sloping angel θ of the tip of the aspirating tube is excessively enlarged too much, the speed of extracting the solid material is lowered.

As a result of the consideration, the present inventor found that: the sloping angel θ of the tip of the aspirating tube, which is suitable to extract the solid material, is in the range of 0° to 70°, favorably 0° to 60°, more favorably 0° to 50°.

The tip of the aspirating tube may be equipped with a hollow portion at the tip of the aspirating tube, wherein the hollow portion sinks below a surface perpendicular to the tube axis direction of the aspirating tube. The shape of the hollow portion is, for example, a rectangle such as wedge.

If the end surface is sloped or has a hollow portion, a suitable space is formed between the solid material and the tip of the aspirating tube. Therefore, the stream of the air at the tip portion of the aspirating tube can efficiently be utilized for extracting the solid material, and the stream of the air can always be kept stable. As a result, the speed of extracting the solid material is improved.

The outer circumference of the tip of the aspirating tube can be equipped with a projection. This projection is effective in maintaining a constant interval between the outer surface of the aspirating tube and the inner wall of the reaction tube, and also has a function of improving rigidity and deformation resistance of the aspirating tube. If the projection is intermittently arranged in the circumferential direction as an arranging shape of the projection, the stream of the air is little inhibited wherein the stream is passed through the space between the aspirating tube and the reaction tube. The projections can also be arranged in a spiral.

The tip of the aspirating tube may be used by connecting to an adaptor that is made of a different member from the rear portion, such as metals (for example, stainless steel and carbon steel) and resins. For example, when the solid material is larger than the inner diameter of the aspirating tube or the solid material is strongly attached to the inner wall of the reaction tube, the extraction is difficultly carried out by using an aspirating tube made of a comparatively soft material such as polyethylene. However, when the tip of the aspirating tube is equipped with an adaptor processed by a rigid material such as a metal, the extraction can be carried out while the solid material is finely crushed with the tip of the adaptor. Therefore, the effect of improving efficiency of extraction is obtained.

In the extracting step, the solid material moves in the aspirating tube together with the stream of the air at high speed. Depending upon the kind of the material of the aspirating tube and a piping attached thereto or the exhaust gas aspirator as used, static electricity may be caused due to friction. Depending upon the solid material as extracted, there is a danger of ignition or explosion due to the static electricity. Therefore, it is favorable to connect to the earth in a proper place to ensure safety.

Incidentally, when powdery dust is extremely caused because the solid material as extracted is brittle, or when there is a danger of causing spontaneous combustion of a catalyst or a substance attached thereto by coming into contact with oxygen, the treatment of wetting the solid material may be carried out with mineral oil blended with water or various additives, and chemicals such as surfactants before the extracting work is carried out. For example, the techniques as described in JP-A-140369/1975 and JP-A-73038/1984 can be applied thereto. In addition, a plate member having anti-ventilation may be placed in the reactor. For example, the technique as described in JP-A-35842/1986 can be applied thereto.

Function and Effects

Powdery dust is not caused at a workshop and the extracting work can be carried out in an extremely favorable working environment if the aspirating tube for extraction directly or indirectly connected to the exhaust gas aspirator is used, and the tip of the aspirating tube is inserted from any opening of the reaction tube, and the solid material is extracted by aspirating it together with the stream of the air. In addition, the efficiency of the extracting work is improved by properly settling the kind of material, the outer diameter, or the tip shape of the aspirating tube for extraction, and the time for extracting the solid material can be reduced.

Furthermore, when the solid material is extracted from an opening portion at the upper end of the reaction tube, only the useless solid material can selectively be extracted, and the separation and recovery of the catalyst as extracted are easily carried out by inserting the tip of the aspirating tube from the opening portion of the reaction tube to a desired position.

For example, in a reactor in which a reaction is carried out by packing reaction regions with each different kinds of catalysts and inert substances wherein the reaction regions are obtained by dividing the reaction tube into two or more portions in the tube axis direction of the reaction tube, as is described in JP-A-130722/1999, only the catalyst packed in the upper reaction region can be extracted. Particularly, the extraction is carried out from the bottom of the reaction tube in the conventional method, and therefore it is necessary to extract the catalyst packed in the lower reaction region wherein it is not necessary to extract the catalyst. However, if the extraction process according to the present invention is carried out, only the catalyst packed in the upper reaction region can selectively be extracted by inserting the tip of the aspirating tube to a desired position of the reaction tube.

The extraction process according to the present invention is not only utilized for extracting a solid material such as a deteriorated catalyst from a shell-and-tube reactor when fillers such as catalysts are exchanged, but can also be utilized for a work of adjusting the amount of the fillers as packed when a new catalyst or inert substance is packed in a reaction tube of the shell-and-tube reactor.

When the reaction tube is packed with the catalyst or inert substance in order to industrially carry out a catalytic reaction with the shell-and-tube reactor, a person having ordinary skill in the art naturally recognizes that the amount of the catalyst as packed (height of the packed catalyst layer) in each reaction tube and the pressure drop of each reaction tube as caused by packing are ideally favorable to be uniform If the weight or volume of the catalyst is accurately measured beforehand when the catalyst is packed in the reaction tube, the height of the packed catalyst layer or the pressure drop of the catalyst in each reaction tube must be uniform after packing. However, the height of the packed catalyst layer or the pressure drop of the catalyst in each reaction tube varies because there is a little difference concerning the shape and the diameter of the catalyst is used in reality, and the speed of packing the catalyst when packing is not always uniform.

In the above way, extraordinary efforts are necessary for packing in a shell-and-tube reactor having hundreds to tens of thousands of reaction tubes, so that the height of the packed layer and the pressure drop of a solid material such as a catalyst will be uniform in all the reaction tubes.

Accordingly, the performance of the catalyst and the ability of the machines are actually considered, and these height of the packed layer and pressure drop are adjusted so that they can be included in standard values as beforehand determined. Then, as to a reaction tube that is not satisfied with the standard values after packing and has higher height of the packed catalyst layer or pressure drop, the following work is carried out: extracting the packed material and re-packing it.

Then, when the extraction process according to the present invention is utilized as a method for partially extracting a catalyst as packed, it is unnecessary to extract the entirety of the catalyst as packed, and the work of efficiently adjusting the height of the packed layer and the pressure drop can be carried out. (Modes for Carrying Out the Invention):

Hereinafter, the modes for carrying out the present invention are explained in detail.

Shell-and-tube Reactor

Figure 2:
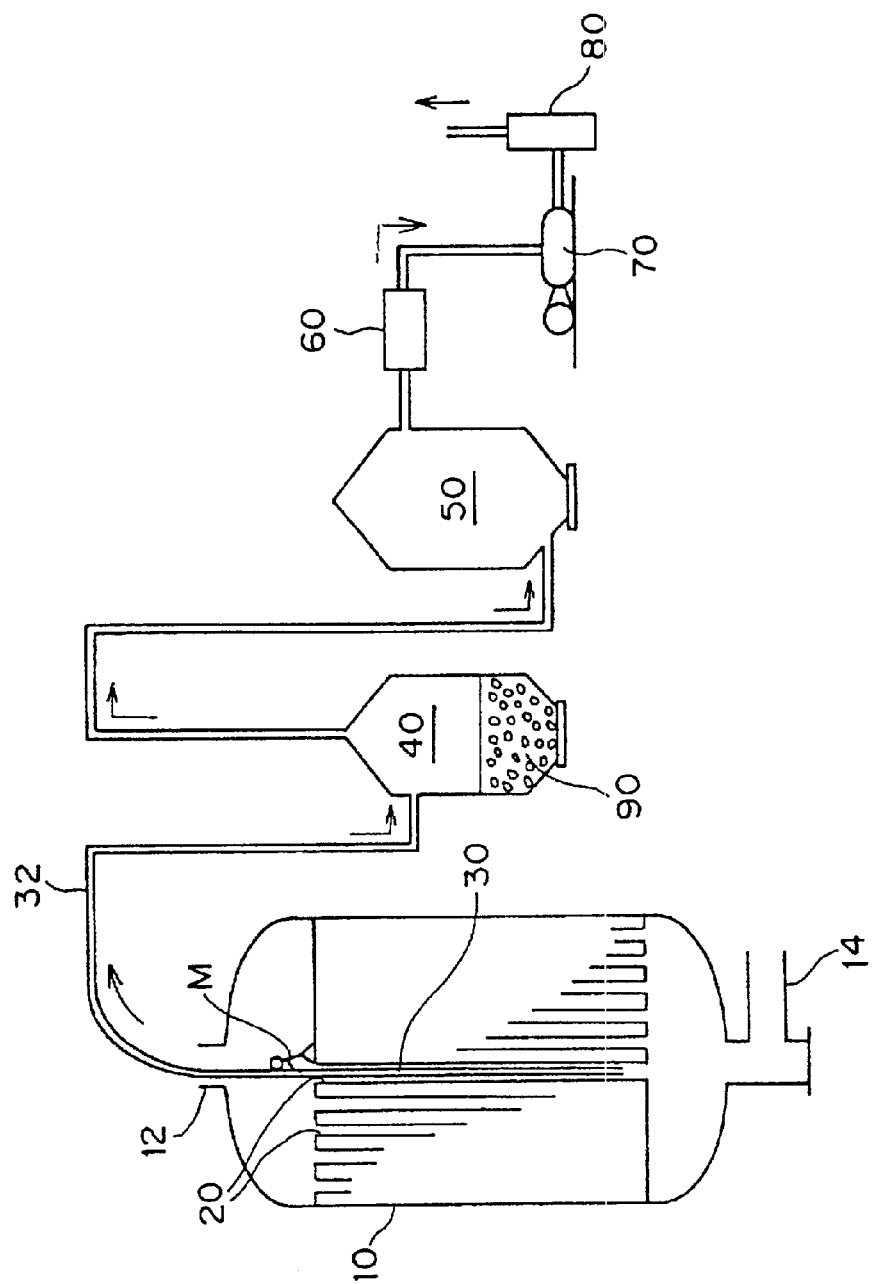
FIG. 2 is a general constitutional view showing the mode for carrying out the present invention.

As is shown in FIG. 2, a shell-and-tube reactor 10 is equipped with a plurality of reaction tubes 20 that are arranged in the vertical direction. In/outlets 12, 14 for reaction fluid are arranged at the upper and lower end of the reactor 10.

The in/outlets 12, 14 of the reactor 10 are connected to such as a supplying apparatus of the reaction fluid, a treating apparatus in a preceding step, and a treating apparatus in a subsequent step through piping, but their drawings are omitted. In addition, the reactor 10 can be equipped with the same mechanistic apparatus as of an ordinary reactor 10, such as a temperature-adjusting apparatus that heats or cools the reaction fluid, and a sensor which observes proceeding of reaction.

Figure 3:
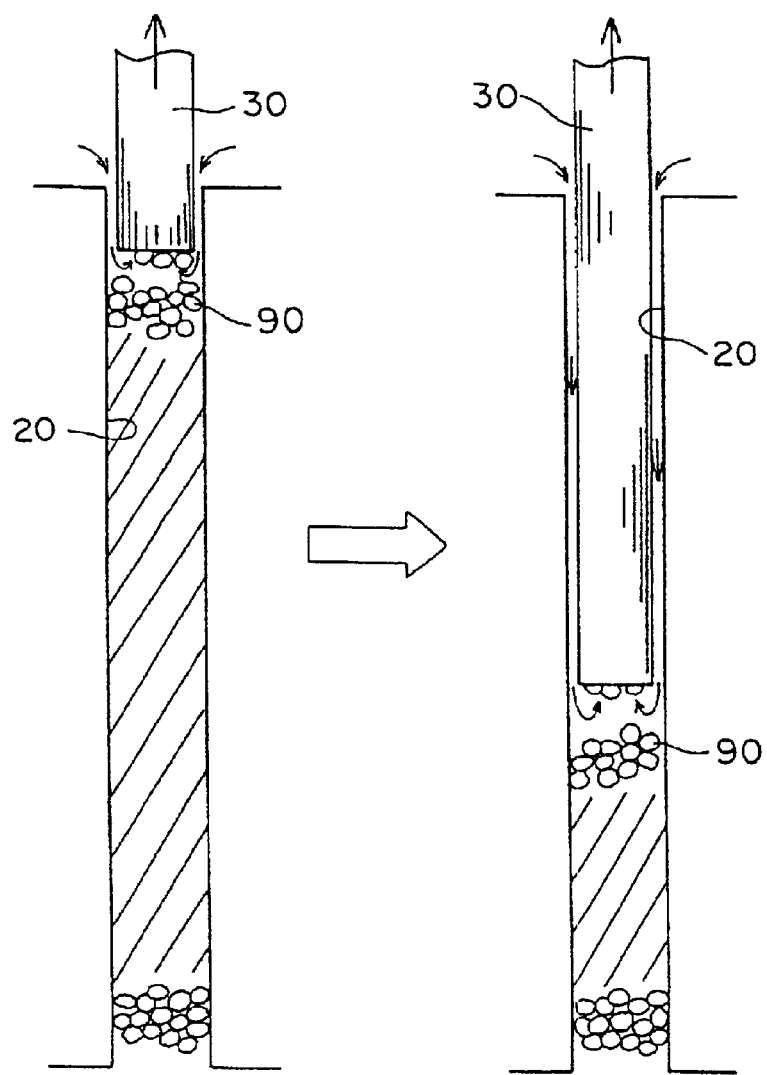
FIG. 3 is a rough sectional view showing the step of extracting a solid material from a reaction tube.

As is shown in FIG. 3, the reaction tube 20 is packed with a particulate lump catalyst 91) as a solid material. The reaction fluid passing through the reaction tube 20 comes into contact with the catalyst 90, and then the determined reaction is caused by catalysis. Thereafter, the resultant reaction fluid is exhausted from the reactor 10.

When the function of the catalyst 90 is lowered because the continuation of operating the reactor 10 causes varying properties of the catalyst 90 and attaching a by-product onto the surface of the catalyst 90, the catalyst 90 is taken out from the reaction tube 20 and a new catalyst 90 is packed again.

Extraction of Catalyst

After the reaction fluid is exhausted from the reactor 10 and the inside of the reactor 10 is washed, the work of extracting the catalyst 90 from the inside of the reaction tube 20 its carried out.

As is shown in FIG. 2, a worker M mounts a working floor where opening upper ends of the reaction tubes 20 are lining, and arranges a tip of an aspirating tube 30 at the upper end of the reaction tube 20, and then inserts the aspirating tube 30 into the reaction tube 20.

The aspirating tube 30 extends outside from the in/outlet 12 of the reactor 10 through a manhole placed at any place of the reactor 10, and passes through a piping 32, and then comes into contact with a solid-material-trapping apparatus 40 that is arranged outside of the reactor 10. The solid-material-trapping apparatus 40 separates only the catalyst 90 as the solid material from the stream of the air.

The solid-material-trapping apparatus 40 is connected to a bug filter 50, a cooler 60, an exhaust gas pump 70, and a silencer 80 through the piping 32. The exhaust gas pump 70 is a vacuum pump that is driven by such as a motor, and causes the stream of the air by forcibly exhausting the air in the piping 32. Even only the exhaust gas pump 70 can achieve fundamental functions such that the solid material is extracted with the aspirating tube 30 and the separation and recovery of the solid material from the stream of the air is carried out by the solid-material-trapping apparatus 40. However, it is effective for the prevention of the environmental pollution and the improvement of the working environment to comprise the bug filter 50, the cooler 60, and the silencer 80. For example, the bug filter 50 can catch minute powdery dust from the stream of the air wherein the dust cannot be caught by the solid-material-trapping apparatus 40. The cooler 60 can cool the air in the piping 32 and prevents an overheated exhaust gas from discharging. If the stream of the air in the piping 32 is not very heated, the cooler 60 may not be necessary. The silencer 80 can reduce noise caused by the stream of the air in the piping 32.

The solid material 90, which is separated and recovered from the stream of the air by the solid-material-trapping apparatus 40, can be disused or recovered or reused to obtain useful sources by conventional means. For example, when a solid material 90 is a catalyst, metals as included therein can be transferred to separation and recovery treatment.

Extracting Work

In FIG. 2, one end of the aspirating tube 30, which is connected to the solid-material-trapping apparatus 40 through the piping 32, is drawn into the reactor 10, and the tip of the aspirating tube 30 are arranged at the upper end of the reaction tube 20.

As is described in FIG. 3 in detail, air is aspirated from the tip of the aspirating tube 30. When the tip of the aspirating tube 30 is arranged on the solid material 90 packed in the inside of the reaction tube 20, the solid material 90 is drawn to the stream of the air as aspirated to the aspirating tube 30, and then is also aspirated to the aspirating tube 30. The solid material as aspirated to the aspirating tube 30 is transferred to the solid-material-trapping apparatus 40 through the piping 32, and is separated from the stream of the air to recover.

When the solid material 90 is aspirated at the tip of the aspirating tube 30, the upper end of the solid material 90 in the reaction tube 20 is apart from the tip of the aspirating tube 30 at a distance corresponding to only the amount of the solid material 90 as aspirated. Therefore, the reaction tube 20 is inserted so that the tip of the aspirating tube 30 will approach the upper end of the solid material 90.

If this movement is continuously carried out, the solid material 90 packed in the reaction tube 20 all over the entirety of its length can be extracted. In addition, if the aspirating tube 30 is inserted into the reaction tube 20 halfway and the further insertion is stopped, the solid material 90 placed a little below the tip position of the aspirating tube 30 is extracted, and then the solid material 90 placed below remains while being packed. Then, if the depth of the tip of the aspirating tube 30 as inserted is adjusted, the height of the packed layer of the residual solid material 90 in the reaction tube 20 can freely be adjusted.

Incidentally, the outer diameter of the aspirating tube 30 is settled in order to make space such that the air outside the reaction tube 20 can efficiently be supplied to the tip portion of the aspirating tube 30, wherein the space is between the inner wall of the reaction tube 20 and the outer wall of the aspirating tube 30.

Tip Structure of Aspirating Tube

Figure 4:
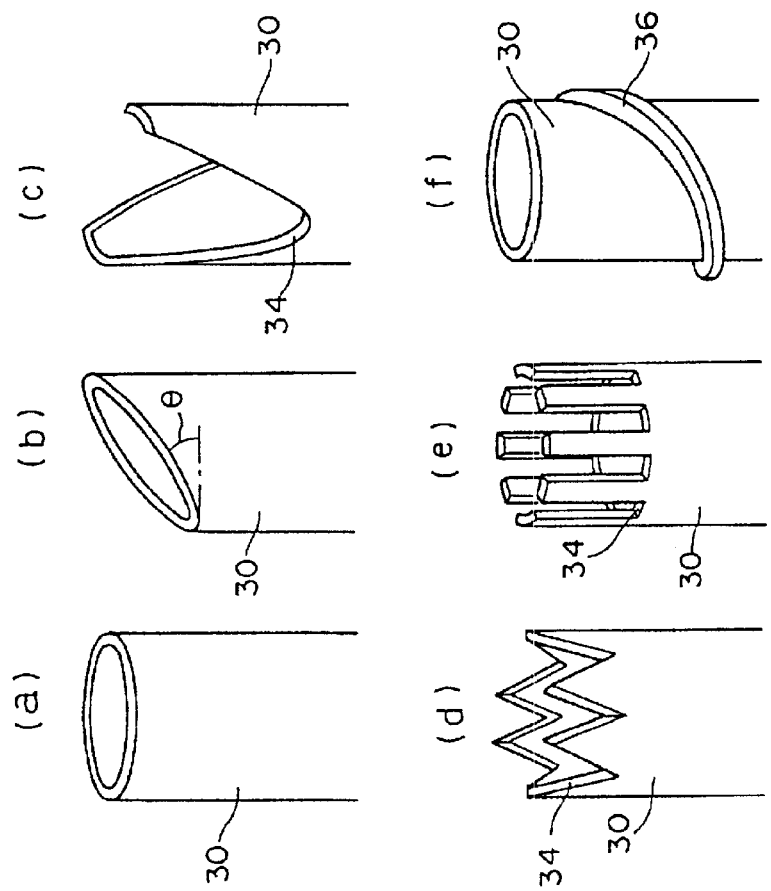
FIG. 4 is a perspective view showing an example of the structure of an aspirating nozzle.

FIG. 4 describes some kinds of examples having different tip structures of the aspirating tube.

In FIG. 4(a), the tip of the aspirating tube 30 has a circular end surface that is obtained by horizontally cutting with a surface perpendicular to the tube axis direction.

In FIG. 4(b), the tip of the aspirating tube 30 has an elliptic end surface sloping at a sloping angle θ toward a surface perpendicular to the tube axis. In comparison with FIG. 4(a), the substantial opening area is larger, and a suitable space is formed between the solid material 90 and the tip of the aspirating tube 30. Therefore, the solid material 90 is easily aspirated together with the stream of the air. The solid material 90, which comes into contact with the tip of the aspirating tube 30, is aspirated to the aspirating tube 30 while being moved along the slope. Therefore, the opening is prevented from being clogged with the solid material 90 while the solid material 90 comes into contact with the end surface.

In FIG. 4(c), two parts, which are placed at the tip of the aspirating tube 30 and against each other in the diameter direction, have hollow portions 34 that are vacant at their tips and have a U-shape. As is similar to the structure of FIG. 4(b), the substantial opening area of the tip is larger, and a suitable space is formed between the solid material 90 and the tip of the aspirating tube 30. The aspirating tube comprises two or more hollow portions 34. Therefore, even if one hollow portion 34 is temporarily clogged with the solid material 90, the other hollow portion 34 can aspirate the stream of the air and the solid material 90. In addition, the function of removing the block of the solid material 90 is caused because the solid material 90 clogged in one hollow portion 34 is moved by the power of the stream of the air and the solid material 90 passing through the other hollow portion 34, and is aspirated to the aspirating tube 30.

In FIG. 4(d), hollow portions 34 having triangular wedges are lining in the circumferential direction. The function of efficiently aspirating uniformly in the circumferential direction can be displayed by comprising plenty of hollow portions 34. The solid material 90 adhering to the inside of the reaction tube 20 is speared and crashed by the sharp tip between the hollow portions 34, and then can easily be aspirated.

In FIG. 4(e), hollow portions 34 having long and slender rectangles are lining in the circumferential direction. If the tip surface of the aspirating tube 30 is clogged with the lump of the solid material 90, an opening having sufficient size can be kept at the outer surface. In this case, if the width of the hollow portion 34 is settled somewhat larger than the particle diameter of the solid material 90, the aspiration of the solid material 90 from the hollow portion 34 can favorably be carried out.

In FIG. 4(f), a spiral projection 36 having only determined length is arranged at the outer circumferential surface of the aspirating tube 30. A space through which the stream of the air passes can surely be arranged between the reaction tube 20 and the aspirating tube 30, and the air can efficiently be supplied to the tip of the aspirating tube because the outer circumferential end comes into contact with the inner wall of the reaction tube 20. Even if the projections 36 are arranged all over the circumference, and if the projections 36 are in a spiral, the air can pass along the spiral. Therefore, there is no problem of cutting off the stream of the air at the portion of the spiral projections 36.

Adjustment of Amount of Solid Material as Packed

Figure 5:
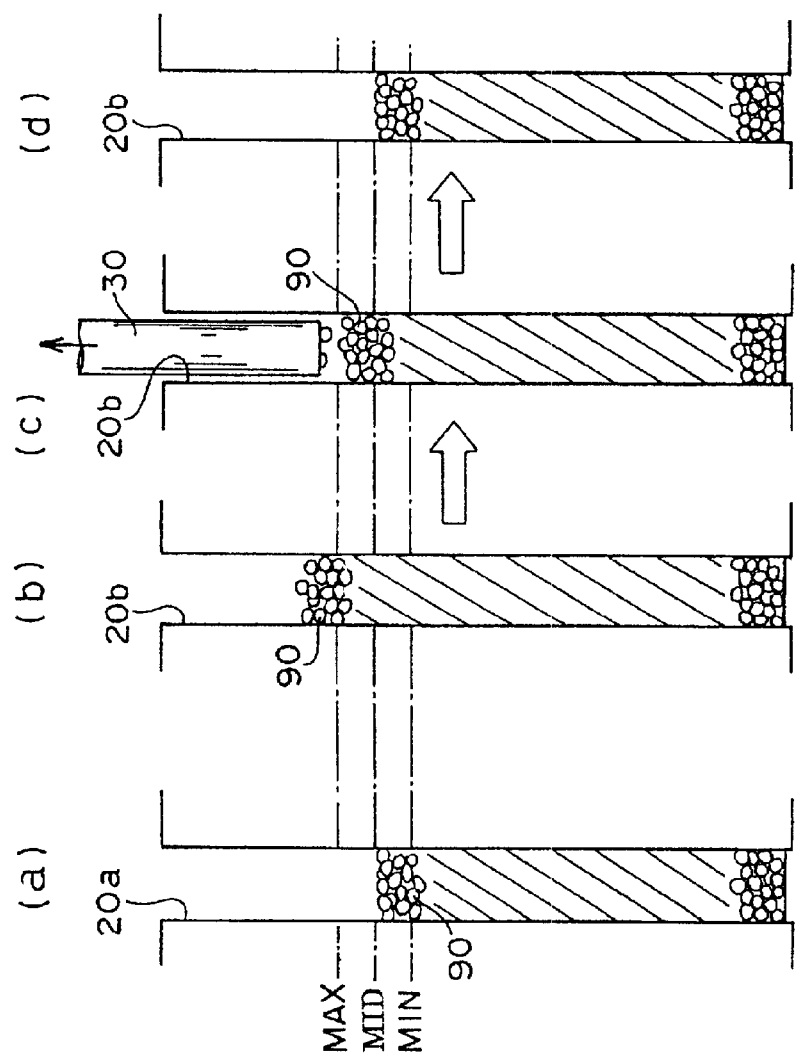
FIG. 5 is a model sectional view explaining a method for adjusting the amount as extracted.

FIG. 5 describes a method for adjusting the height (amount) of the packed layer of the solid material 90 as packed in the reaction tube 20 by utilizing the aspirating tube 30.

The situation such that the reaction tube 20a is packed with the solid material 90 in a proper amount is described in (a). A proper height of the packed layer is shown by <MID> line. An allowable range of the height of the packed layer is between <MAX> line and <MIN> line.

The situation such that the height of the packed layer is too high after packing the solid material 90 is described in (b). The height of the packed layer of the solid material 90 is above the <MAX> line.

Accordingly, as is shown in (c), the aspirating tube 30 is inserted from the upper end of the reaction tube 20b, and the solid material 90 is extracted from the tip of the aspirating tube 30. As is shown in (d), if the tip of the aspirating tube 30 is inserted to the position which is below the <MAX> line ;and not below the <MIN> line, namely, the position as close to the <MIN> line as possible, the position of the upper end of the residual solid material 90 in the reaction tube 20 is surely settled between the <MAX> line and the <MIN> line.

Incidentally, if each the distance from the <MANX> line, the <MID> line, or the <MIN> line to the upper end of the reaction tube 20b is measured or calculated beforehand, the degree of inserting the aspirating tube 30 into the reaction tube 20b may be adjusted in proportion to the distance. If indication lines corresponding to the <MAX>, <MID>, and <MIN> are represented on the outer circumference of the aspirating tube 30, it is easy to carry out the work by aiming at these indication lines. If a projection stopper is arranged at the position corresponding to the <MID> on the outer circumference of the aspirating tube 30 and the aspirating tube 30 is inserted to the position where the stopper is caught on the opening as arranged at the upper end of the reaction tube 20b, the depth of inserting the aspirating tube 30 can easily and surely be settled.

In addition, the pressure drop after packing the solid material 90 in the reaction tube also has an allowable range. In a reaction tube 20 having a pressure drop exceedingly higher than its upper limit-after packing the solid material 90, the solid material 90 is extracted by aspiration in order to aim at the lower limit of the height of the packed layer, namely, the <MIN> line as a lower limit, and then the adjustment may be carried out so that the pressure drop will be within standard values.

Extraction of Only Solid Material in Specific Layer

Figure 6:
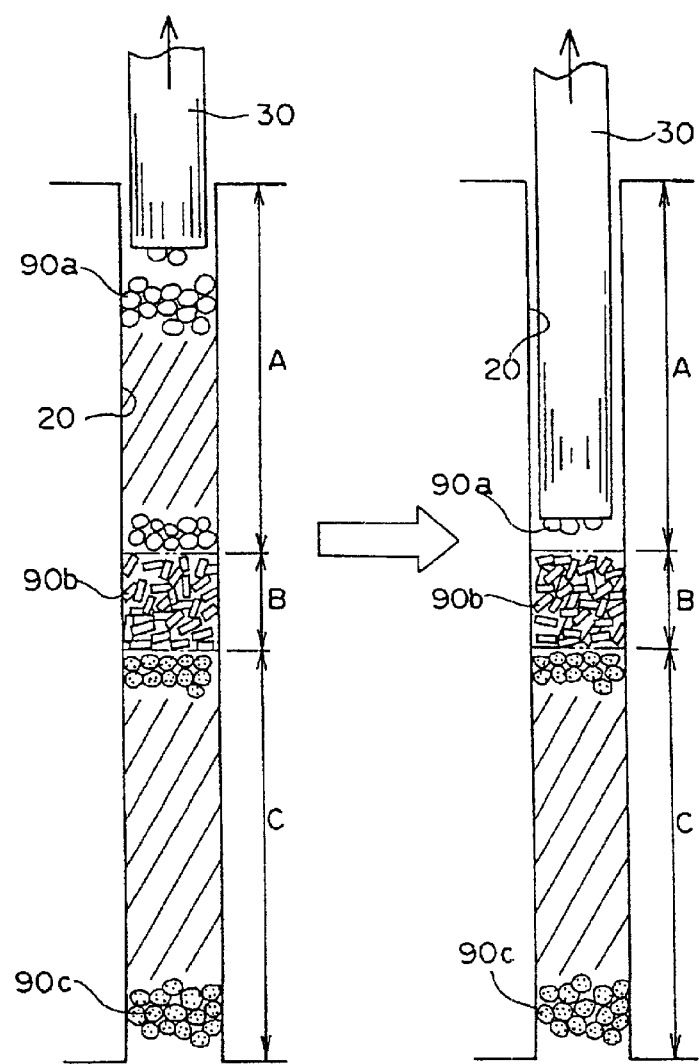
FIG. 6 is a model sectional view showing a method for extracting only the solid material in a specific layer.

A mode for carrying out the present invention as shown in FIG. 6 describes a method for extracting only the solid material 90 in a specific layer from the reaction tube 20.

The reaction tube 20 is packed with a catalyst 90c, an inert substance 90b for isolation, and a catalyst 90a in order from the bottom. The catalyst 90c is packed from the lower end of the reaction tube 20 up to the height C, and the inert substance 90b is packed thereon up to the height B, and the catalyst substance 90a is packed at the highest up to the height A. Such a packing structure is applied to a reaction method that involves coming into contact with reaction fluid in order, and continuously carrying out a reaction caused by the respective catalysts 90a and 90c. The inert substance 90b is made of various metals, ceramics, or resins, and has a shape such as a spherical shape, or a ring shape. The inert substance has a function of heating or cooling the reaction fluid together with surely isolating the catalysts 90a and 90c.

The work of extracting only the catalyst 90a from the reaction tube 20 in the above way is carried out, wherein the activity of the catalyst 90a is lowered.

The aspirating tube 30 is arranged at the upper end of the reaction tube 20 and aspirated. The catalyst 90a as packed in the upper portion of the reaction tube 20 is aspirated into the aspirating tube 30 with air, and then extracted. If the tip of the aspirating tube 30 is inserted to a position which is a little above the depth A of the reaction tube 20, all the catalyst 90a is extracted, and besides, the inert substance 90b and the catalyst 90c remain in the reaction tube 20.

Thereafter, if the reaction tube 20a is packed with a new catalyst 90a or a regeneration-treated catalyst 90a, the aimed reaction treatment can be started again If the catalyst 90c remains and only the inert substance 90b is extracted after the step of extracting the catalyst 90a, the exchange of the inert substance 90b can be carried out. In this case, if the catalyst 90a is recovered and removed from the solid-material-trapping apparatus 40 at the stage when the extraction of the catalyst 90a is completed, only the inert substance 90b is recovered in the solid-material-trapping apparatus 40 in the subsequent step.

Furthermore, if the catalyst 90c is extracted after taking out the inert substance 90b as recovered in the solid-material-trapping apparatus 40 when the catalyst 90c is extracted, only the catalyst 90c is recovered in the solid-material-trapping apparatus 40.

In this method, the solid materials 90a, 90b and 90c having different kinds each can be separately classified and recovered.

Effects and Advantages of the Invention

When the extraction of a solid material in a reactor is carried out, the following effects are attained according to the present invention.

(a) Powdery dust is little caused, and the extracting work can be carried out under a safe and sanitary working environment.

(b) The time for carrying out the extracting work is shortened.

In addition, when the extraction is carried out from an upper end of a reaction tube, the following effects are attained.

(c) The solid material up to any position in a reaction tube can be extracted.

(d) It is easy to classify, recover, and reuse catalysts as extracted.

Therefore, the present invention is extremely useful as a process for extracting a solid material in a shell-and-tube reactor.

DETAILED DESCRIPTION OF THE PREFERRED EMBODIMENTS

Hereinafter, an example, which involves extracting a solid material such as a catalyst as used for an oxidation reaction from a shell-and-tube reactor, is referred as one example of the present invention, and the mode for carrying out the present invention is more specifically illustrated thereby. However, the present invention is not limited thereto.

Incidentally, the average necessary time for extraction and the amount of powdery dust as formed are each defined in the following way.

Average Necessary Time for Extraction:

An average time (second) to be necessary to extract the entirety of a solid material from one reaction tube.

Amount of Powdery Dust:

An amount (mg) of powdery dust as attached to a dust-inhibiting mask that a worker puts on after all the solid materials are extracted from one hundred of reaction tubes.

Amount of powdery dust=(dry weight of dust-inhibiting mask after work of extracting one hundred of reaction tubes)−(dry weight of dust-inhibiting mask before work)

EXAMPLE 1

According to the method described in Example 1 of JP-A-210937/1992, the reaction for producing methacrylic acid from methacrolein was carried out. Incidentally, the number of reaction tubes was ten thousand, and the length of the reaction tube was 3,000 mm.

After the reaction was carried out for 8,000 hours, the reaction tubes were cooled, and then the following extracting work was carried out.

Extracting Work

One end of an aspirating tube consisting of a polyethylene tube with an outer diameter of 21 mm and an inner diameter of 18 mm was connected to an exhaust gas aspirator, wherein the exhaust gas aspirator was connected to an exhaust gas pump of which capacities were an air-aspiration amount of 3.0 m³/min and an attained vacuum degree of 19,600 Pa through a solid-material-trapping apparatus. The tip of the aspirating tube at the side as inserted was cut to form a horizontal end surface as shown in FIG. 4(a).

The aspirating tube for extraction was gradually inserted to the bottom of the reaction tube from an upper opening of the reaction tube, and all the catalysts as packed in the reaction tube were extracted together with air. This extracting work was carried out for a hundred reaction tubes in total.

The average necessary time for extraction was 22 seconds. In addition, the amount of powdery dust was 91 mg.

COMPARATIVE EXAMPLE 1

An extracting work was carried out for a hundred reaction tubes in the same way as of Example 1 except for carrying the following extracting work.

Extracting Work

A piano wire having 4 mm×2 mm square and a length of 4,500 mm was prepared. One end of the piano wire was inserted from a lower opening of the reaction tube, and all the solid materials such as catalysts in the reaction tube were gradually dropped and extracted while the upper portion of the reaction tube was speared up with the piano wire.

A large amount of powdery dust was caused while the extracting work was carried out. In addition, a worker carried out the work with putting on not only a dust-inhibiting mask but also a cotton hood, a dust-inhibiting wear, a helmet, a goggle, and gloves so as to protect his body from droppings.

The average necessary time for extraction was 40 seconds. In addition, the amount of powdery dust was 1,594 mg.

EXAMPLE 2

An extracting work was carried out for a hundred reaction tubes in the same way as of Example 1 except for using an aspirating Lube consisting of a polyethylene tube with an outer diameter of 18.5 mm and an inner diameter of 15 mm.

The average necessary time for extraction was 30 seconds. In addition, the amount of powdery dust was 87 mg.

EXAMPLE 3

An extracting work was carried out for a hundred reaction tubes in the same way as of Example 1 except for using an aspirating tube consisting of a polyethylene tube with an outer diameter of 23 mm and an inner diameter of 18 mm.

The average necessary time for extraction was 28 seconds. In addition, the amount of powdery dust was 87 mg.

EXAMPLE 4

An extracting work was carried out for a hundred reaction tubes in the same way as of Example 1 except for using an aspirating tube consisting of a polyethylene tube with an outer diameter of 17 mm and an inner diameter of 15 mm.

The average necessary time for extraction was 42 seconds. In addition, the amount of powdery dust was 80 mg.

EXAMPLE 5

An extracting work was carried out for a hundred reaction tubes in the same way as of Example 1 except for using an aspirating tube consisting of a polyethylene tube with an outer diameter of 24.5 mm and an inner diameter of 18 mm.

The average necessary time for extraction was 40 seconds. In addition, the amount of powdery dust was 77 mg.

EXAMPLE 6

An extracting work was carried out for a hundred reaction tubes in the same way as of Example 1 except for using an aspirating tube consisting of a polyethylene tube with an outer diameter of 21 mm and an inner diameter of 14 mm.

The average necessary time for extraction was 33 seconds. In addition, the amount of powdery dust was 85 mg.

EXAMPLE 7

An extracting work was carried out for a hundred reaction tubes in the same way as of Example 1 except for using an aspirating tube consisting of a polyethylene tube with an outer diameter of 21 mm and an inner diameter of 12 mm.

The average necessary time for extraction was 58 seconds. In addition, the amount of powdery dust was 93 mg.

EXAMPLE 8

An extracting work was carried out for a hundred reaction tubes in the same way as of Example 1 except for using an aspirating tube for extraction, wherein the tip of the aspirating tube at the side as inserted was cut to form a sloping end surface (sloping angle $\theta=45$) as shown in FIG. 4(b).

The average necessary time for extraction was 18 seconds. In addition, the amount of powdery dust was 90 mg.

EXAMPLE 9

An extracting work was carried out for a hundred reaction tubes in the same way as of Example 1 except for using an aspirating tube for extraction, wherein the tip of the aspirating tube at the side as inserted was cut to form a sloping end surface (sloping angle $\theta=65$) as shown in FIG. 4(b).

The average necessary time for extraction was 25 seconds. In addition, the amount of powdery dust was 84 mg.

EXAMPLE 10

An extracting work was carried out for a hundred reaction tubes in the same way as of Example 1 except for using an aspirating tube for extraction, wherein the tip of the aspirating tube at the side as inserted was cut to form a sloping end surface (sloping angle $\theta=75$) as shown in FIG. 4(b).

The average necessary time for extraction was 44 seconds. In addition, the amount of powdery dust was 80 mg.

EXAMPLE 11

An extracting work was carried out for a hundred reaction tubes in the same way as of Example 1 except for connecting an adaptor to the side where the aspirating tube for extraction was inserted to the reaction tube, wherein the adaptor was cut to form an end surface having a hollow portion 34 as shown in FIG. 4(c). The adaptor, which was made of stainless steel and had an outer diameter of 19 mm and an inner diameter of 17 mm, was used.

The average necessary time for extraction was 18 seconds. In addition, the amount of powdery dust was 83 mg.

EXAMPLE 12

According to the method described in Example 1 of JP-A-130722/1999, the reaction for producing acrylic acid from propylene was carried out. Incidentally, the number of reaction tubes was ten thousand. In addition, a columnar material having an outer diameter of 6 mm and a height of 6 mm was used as the preceding catalyst.

After the reaction was carried out for 8,000 hours, the reaction tubes were cooled, and then the following extracting work was carried out.

Extracting Work

The same aspirator and aspirating tube for extraction as of Example 8 were used, and the tip of the aspirating tube was inserted by 2,500 mm from the upper opening portion of the reaction tube to the bottom of the reaction tube, and only the subsequent catalyst was extracted. When the subsequent catalyst was taken out of the solid-material-trapping apparatus arranged between the aspirator and the aspirating tube, the raschig ring was contaminated in the subsequent catalyst in an amount of only 0.1 wt %. Therefore, only the subsequent catalyst could selectively be recovered. Next, the tip of the of the aspirating tube was inserted by 3,200 mm from the upper opening portion of the reaction tube to the bottom of the reaction tube, and only the raschig ring was extracted. Then the raschig ring was taken out of the solid-material-trapping apparatus, the preceding catalyst was contaminated in the subsequent catalyst in an amount of only 0.2 wt %.

In the above way, according to the present invention process, only the subsequent catalyst can be extracted without extracting the preceding catalyst, and further the packed materials (for example, catalysts) as packed in each reaction region can be selectively extracted to nearly perfection. Accordingly, it is easy to classify, recover, and reuse the catalysts as extracted from the reaction tube.

EXAMPLE 13

The vacant reaction tube of the shell-and-tube reactor in Example 12 was packed with the preceding catalyst up to a layer height of 2,800 mm. Next, when the raschig ring was packed, the aimed height of the packed raschig ring layer was 700 mm. However, the practical layer height was 820 mm.

Accordingly, the aspirating tube and aspirator of Example 8 were used, and the tip of the aspirating tube was inserted by 2,500 mm from the upper opening portion of the reaction tube, and the amount corresponding to the upper portion of the raschig ring as packed in a height of 120 mm was extracted so as to adjust the height of the packed raschig ring layer to 700 mm.

In comparison with this method, the conventional method such as Comparative Example 1 has to extract even the preceding catalyst as previously packed and to carry out packing again. Therefore, it is understood that the working efficiency is badly deteriorated.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for extracting a solid material from a shell-and-tube reactor, with the process comprising the step of extracting solid material that is packed in a reaction tube of the shell-and-tube reactor, with the process further comprising: the step (a) of inserting an end of an aspirating tube into an end of the reaction tube wherein the aspirating tube is connected to an exhaust gas aspirator such that a stream of air may be drawn into the end of the aspirating tube; and the step (b) of extracting solid material from the reaction tube by aspirating solid material in the reaction tube through the end of the aspirating tube and through the aspirating tube together with the stream of air drawn into the end of the aspirating tube.

2. A process for extracting a solid material from a shell-and-tube reactor according to claim 1, which further comprises the step (c) of recovering the solid material as extracted with the aspirating tube by separating it from the stream of air after the step (b).

3. A process for extracting a solid material from a shell-and-tube reactor according to claim 2, wherein the step (a) includes the step of inserting the aspirating tube into an upper end of the reaction tube.

4. A process for extracting a solid material from a shell-and-tube reactor according to claim 1, wherein the step (a) includes the step of inserting the aspirating tube into an upper end of the reaction tube.

* * * * *